United States Patent
Tsai et al.

(10) Patent No.: US 10,637,690 B1
(45) Date of Patent: Apr. 28, 2020

(54) APPARATUS FOR PERFORMING DECISION FEEDBACK EQUALIZER ADAPTATION CONTROL

(71) Applicants: FARADAY TECHNOLOGY CORPORATION, Suzhou, Jiangsu Province (CN); Faraday Technology Corp., Hsin-Chu (TW)

(72) Inventors: Fu-Chien Tsai, Hsin-Chu (TW); Yin-Fu Lin, Hsin-Chu (TW); Ling Chen, Hsin-Chu (TW)

(73) Assignees: FARADAY TECHNOLOGY CORPORATION, Suzhou, Jiangsu Province (CN); Faraday Technology Corp., Hsin-Chu (TW)

( * ) Notice: Subject to any disclaimer, the term of this patent is extended or adjusted under 35 U.S.C. 154(b) by 0 days.

(21) Appl. No.: 16/575,359

(22) Filed: Sep. 18, 2019

(30) Foreign Application Priority Data

Apr. 4, 2019 (CN) .......................... 2019 1 0270456

(51) Int. Cl.
| | |
|---|---|
| *H03K 5/159* | (2006.01) |
| *H04L 25/03* | (2006.01) |
| *H04L 25/02* | (2006.01) |
| *H04B 1/16* | (2006.01) |

(52) U.S. Cl.
CPC ......... *H04L 25/03057* (2013.01); *H04B 1/16* (2013.01); *H04L 25/0292* (2013.01)

(58) Field of Classification Search
CPC .. H04L 25/03057; H04L 25/0292; H04B 1/16

USPC ........................................................ 375/233
See application file for complete search history.

(56) References Cited

U.S. PATENT DOCUMENTS

| | | | | | |
|---|---|---|---|---|---|
| 5,259,005 | A | * | 11/1993 | LaRosa ................. | H04L 7/0337 375/355 |
| 2007/0230640 | A1 | * | 10/2007 | Bryan ............... | H04L 25/03057 375/349 |
| 2008/0069198 | A1 | * | 3/2008 | Bhoja ................... | H04L 7/0334 375/233 |
| 2012/0155530 | A1 | * | 6/2012 | Zhong .................. | H04L 7/0087 375/233 |
| 2013/0259113 | A1 | * | 10/2013 | Kumar ............... | H04L 25/0307 375/233 |

\* cited by examiner

*Primary Examiner* — Don N Vo
(74) *Attorney, Agent, or Firm* — Winston Hsu

(57) ABSTRACT

An apparatus for performing decision feedback equalizer (DFE) adaptation control is provided. The apparatus includes arithmetic circuits, slicers, sample and hold circuits, a phase detector and a control circuit for related operations. The control circuit generates parameters at least according to an error sample value and data sample values, and dynamically updates the parameters based on at least one predetermined rule to perform the DFE adaptation control. The parameters include a first parameter, another parameter and a factor adjustment parameter. Regarding at least one data pattern, the control circuit selectively replaces the error sample value with a predetermined value according to whether a temporary storage value of the error sample value conforms to a predetermined condition to control the other parameter and the first parameter, in order to prevent triggering an unstable effect and thereby prevent abnormal operations.

14 Claims, 9 Drawing Sheets

APPARATUS FOR PERFORMING DECISION FEEDBACK EQUALIZER ADAPTATION CONTROL

BACKGROUND OF THE INVENTION

1. Field of the Invention

The present invention is related to data transmission, and more particularly, to an apparatus for performing decision feedback equalizer (DFE) adaptation control.

2. Description of the Prior Art

A conventional decision feedback equalizer (DFE) architecture plays a key role in high speed communications of limited channel band, but has some disadvantages. Although related arts have proposed schemes to solve problems existing in the conventional DFE architecture, these schemes might have additional problems. Thus, there is a need for a novel architecture which can improve the performance of electronic devices without introducing side effects.

SUMMARY OF THE INVENTION

An objective of the present invention is to provide an apparatus for performing decision feedback equalizer (DFE) adaptation control, which can solve the problems of the conventional DFE architecture.

Another objective of the present invention is to provide an apparatus for performing DFE adaptation control in order to improve performance of receivers and related electronic devices without introducing side effects.

At least one preferred embodiment of the present invention provides an apparatus for performing DFE adaptation control, wherein the apparatus is applicable to a receiver. The apparatus may comprise a plurality of arithmetic circuits, a plurality of slicers, a plurality of sample and hold circuits, a phase detector and a control circuit, wherein the arithmetic circuits comprise a first arithmetic circuit and a second arithmetic circuit, and the slicers comprise a data slicer, a set of edge slicers and an error slicer. The data slicer and the error slicer may be coupled to the first arithmetic circuit. The set of edge slicers may be coupled to the second arithmetic circuit. The sample and hold circuits may be coupled to the data slicer. The phase detector may be coupled to the set of edge slicers and coupled to one of the sample and hold circuits. The control circuit may be coupled to the first arithmetic circuit, the data slicer, the error slicer and the sample and hold circuits. The first arithmetic circuit may subtract a first feedback signal from a data signal of the receiver to generate a first signal, and the second arithmetic circuit may subtract a second feedback signal from the data signal to generate a second signal. In addition, the slicers may be configured to generate a plurality of sample values. More particularly, the data slicer may slice the first signal to generate a first data sample value, the set of edge slicers may slice the second signal according to at least one parameter to generate a set of edge sample signals, and the error slicer may slice the first signal according to another parameter to generate an error sample value. Additionally, the sample and hold circuits may perform sample and hold operations according to the first data sample value to generate a plurality of second data sample values, wherein the first feedback signal represents a first linear combination of the second data sample values, and the second feedback signal represents a second linear combination of a portion of second data sample values within the second data sample values. The phase detector may perform phase detection according to at least one of the set of edge sample signals, and a second data sample value within the second data sample values, to generate a phase adjustment signal in order to perform phase adjustment on at least one of a set of clock signals, wherein the set of clock signals is configured to perform sampling control related to slicing operations. Further, the control circuit may generate a plurality of parameters at least according to the error sample value and the second data sample values, and dynamically update the parameters based on at least one predetermined rule to perform DFE adaptation control, wherein the parameters comprise the other parameter, the at least one parameter, a first parameter and a factor adjustment parameter. In an example, an absolute value of any of the at least one parameter is equal to a product of the factor adjustment parameter and the first parameter. Regarding at least one data pattern, the control circuit selectively replaces the error sample value with a predetermined value according to whether a temporary storage value of the error sample value conforms to a predetermined condition to control the other parameter and the first parameter, in order to prevent triggering an unstable effect and thereby prevent the receiver from undergoing abnormal operations. According to some embodiments, the other parameter can be an error adjustment parameter, the at least one parameter can be at least one edge adjustment parameter, and the first parameter can be a data adjustment parameter, but the present invention is not limited thereto. More particularly, the plurality of parameters comprises the error adjustment parameter, the at least one edge adjustment parameter, the data adjustment parameter, and the factor adjustment parameter. For example, an absolute value of any of the at least one edge adjustment parameter is equal to a product of the factor adjustment parameter and the data adjustment parameter. Regarding the at least one data pattern, the control circuit may selectively replace the error sample value with a predetermined value according to whether a temporary storage value of the error sample value conforms to a predetermined condition, to control the error adjustment parameter and the data adjustment parameter in order to prevent triggering an unstable effect, to thereby prevent the receiver from undergoing abnormal operations.

The apparatus of the present invention can solve the problems of the related art without introducing any side effect or in way that is less likely to introduce side effects. In addition, the apparatus of the present invention can prevent unstable effects such as a snowball effect during a process of DFE adaptation control; additionally, the present invention can automatically guide a clock and data recovery (CDR) circuit within a receiver to reach an optimal steady state by adjustment or replacement of sample values. Thus, the apparatus of the present invention can effectively improve the overall performance of related electronic devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
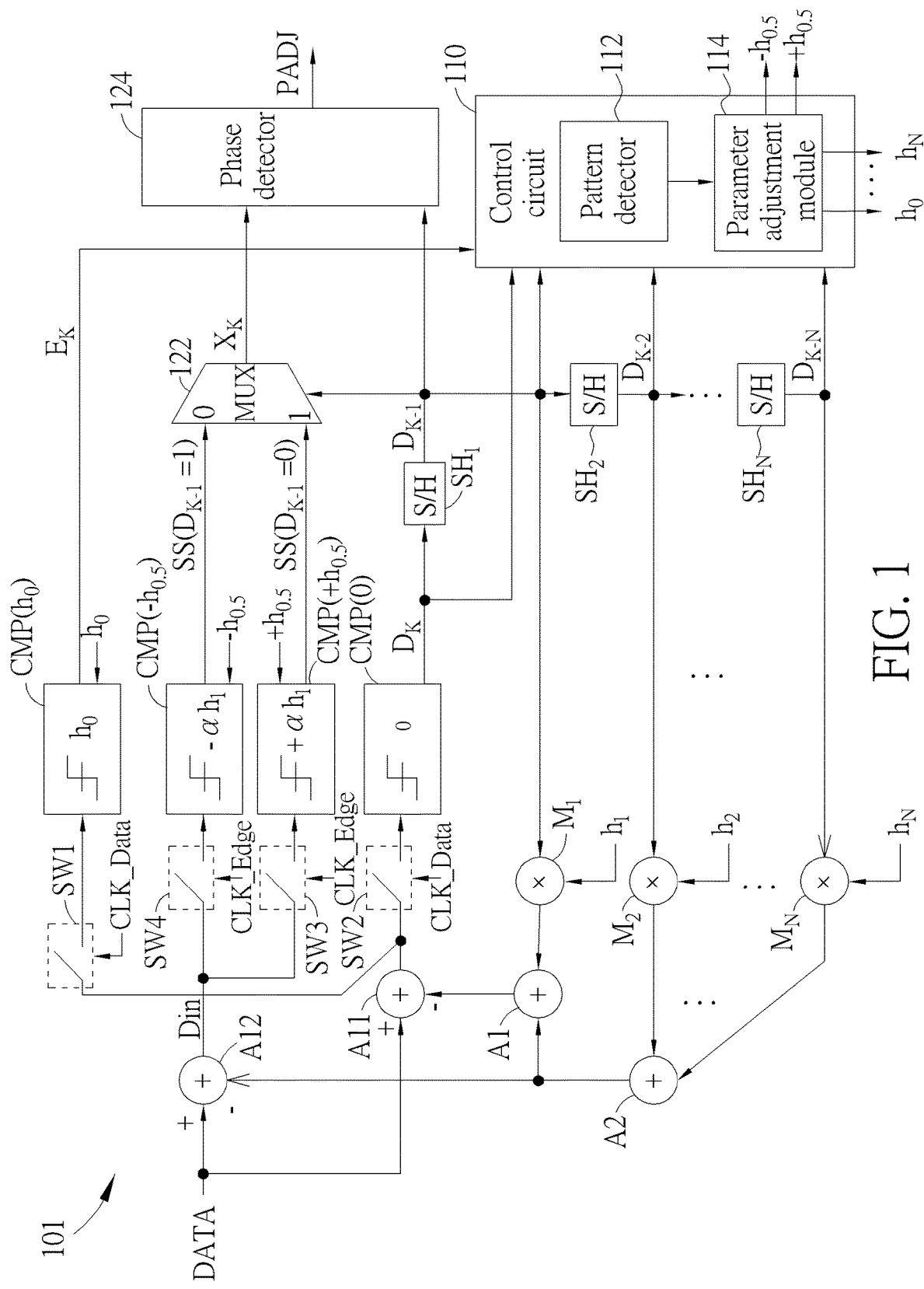
FIG. 1 is an apparatus for performing decision feedback equalizer (DFE) adaptation control according to an embodiment of the present invention.

FIG. 1 is an apparatus 101 for performing decision feedback equalizer (DFE) adaptation control according to an embodiment of the present invention, where the apparatus 101 is applicable to a receiver. The apparatus 101 may be implemented as a clock and data recovery (CDR) device, but the present invention is not limited thereto. The apparatus 101 may comprise a plurality of arithmetic circuits such as arithmetic circuits A11, A12, A1, A2, etc., a plurality of switches such as switches SW1, SW2, SW3, SW4, etc., a plurality of slicers such as slicers CMP(0), CMP(+$h_{0.5}$), CMP(-$h_{0.5}$) and CMP($h_0$), a plurality of sample and hold circuits (labeled as "S/H" in FIG. 1 for brevity) such as sample and hold circuits $SH_1$, $SH_2$, ..., $SH_N$, etc., a plurality of multipliers such as multipliers $M_1$, $M_2$, ..., $M_N$, etc., a control circuit 110, and a phase detection module, where the control circuit may comprise a pattern detector 112 and a parameter adjustment module 114, and the phase detection module may comprise a multiplexer 122 (labeled as "MUX" in FIG. 1 for brevity) and a phase detector 124. Since the slicers CMP(0), {CMP(+$h_{0.5}$), CMP(-$h_{0.5}$)} and CMP($h_0$) may respectively correspond to a data sample path, a set of edge sample paths and an error sample path, these slicers may be respectively referred to as a data slicer CMP(0), a set of edge slicers {CMP(+$h_{0.5}$), CMP(-$h_{0.5}$)} and an error slicer CMP($h_0$). More particularly, the data slicer CMP(0) and the error slicer CMP($h_0$) may be coupled to the arithmetic circuit A11 (e.g. via the switches SW2 and SW1 respectively), and the set of edge slicers {CMP (+$h_{0.5}$), CMP(-$h_{0.5}$)} may be coupled to the arithmetic circuit A12 (e.g. via the switches SW3 and SW4). The sample and hold circuit $SH_1$, $SH_2$, ... and $SH_N$ may be coupled to the data slicer CMP(0). The phase detector 124 may be coupled to the set of edge slicers {CMP (+$h_{0.5}$), CMP(-$h_{0.5}$)} via the multiplexer 122 as shown in FIG. 1, and may be coupled to one of the sample and hold circuits $SH_1$, $SH_2$, ... and $SH_N$ (e.g. the sample and hold circuit $SH_1$). The control circuit 110 may be coupled to the data slicer CMP(0), the error slicer CMP ($h_0$) and the sample and hold circuits $SH_1$, $SH_2$, ... and $SH_N$.

According to this embodiment, the arithmetic circuit A11 may subtract a first feedback signal (e.g. a signal received by an inverted input terminal "−" thereof) from a data signal DATA received by the receiver to generate a first signal (e.g. a signal output by a right side terminal thereof). The arithmetic circuit A12 may subtract a second feedback signal (e.g. a signal received by an inverted input terminal "−" thereof) from the data signal DATA to generate a second signal (e.g. a signal Din output by a right side terminal thereof, wherein the signal Din may be regarded as an input signal). In addition, the slicers CMP(0), CMP(+$h_{0.5}$), CMP (-$h_{0.5}$) and CMP($h_0$) may be configured to generate a plurality of sample values, e.g. sample values $D_K$, $D_{K-1}$, $D_{K-2}$, ..., $D_{K-N}$, sample values $X_K$ and $E_K$. Since the sample values $D_K$, $D_{K-1}$, $D_{K-2}$, ... and $D_{K-N}$ correspond to the data sample path, and the sample values $X_K$ and $E_K$ respectively correspond to the set of edge sample paths and the error sample path, these sample values may be respectively referred to as data sample values $D_K$, $D_{K-1}$, $D_{K-2}$, ... and $D_{K-N}$, an edge sample value $X_K$ and an error sample value $E_K$. The data slicer CMP(0) may slice the first signal according to a predetermined parameter (e.g. a predetermined value or a predetermined parameter value, such as 0) to generate a first data sample value (e.g. the data sample value $D_K$). The set of edge slicers {CMP(+$h_{0.5}$), CMP(-$h_{0.5}$)} may slice the second signal such as the signal Din according to at least one parameter (e.g. at least one edge adjustment parameter such as a set of edge adjustment parameters {+$h_{0.5}$, -$h_{0.5}$}) to generate a set of edge sample signals {SS($D_{K-1}$=0), SS($D_{K-1}$=1)}. The error slicer CMP ($h_0$) may slice the first signal according to another parameter (e.g. an error adjustment parameter such as a parameter $h_0$) to generate the error sample value $E_K$. Additionally, the sample and hold circuits $SH_1$, $SH_2$, ... and $SH_N$ may perform sample and hold operations according to the first data sample value (e.g. the data sample value $D_K$) to generate a plurality of second data sample values such as the data sample values $D_{K-1}$, $D_{K-2}$, ... and $D_{K-N}$. Note that the data sample values $D_K$, $D_{K-1}$, $D_{K-2}$, ... and $D_{K-N}$ may respectively represent data sample values at different time points, where the data sample values $D_K$, $D_{K-1}$, $D_{K-2}$, ... and $D_{K-N}$ have the same source, i.e. the slicer CMP(0), and belong to the sample values.

Based on the architecture shown in FIG. 1 (e.g. the feedback paths constituted by multiple components such as the multipliers $M_1$, $M_2$, ... and $M_N$ and the arithmetic circuits A11, A12, A1 and A2), the first feedback signal may represent a first linear combination of the plurality of second data sample values, such as a linear combination (($h_1$*$D_{K-1}$)+($h_2$*$D_{K-2}$)+ ... +($h_N$*$D_{K-N}$)) of the data sample values $D_{K-1}$, $D_{K-2}$, ... and $D_{K-N}$, and the second feedback signal may represent a second linear combination of a portion of second data sample values (e.g. the data sample values $D_{K-2}$ ... and $D_{K-N}$) within the plurality of second data sample values, such as a linear combination (($h_2$*$D_{K-2}$)+ ... +($h_N$*$D_{K-N}$)) of the data sample values $D_{K-2}$, ... and $D_{K-N}$. The phase detector 124 may perform phase detection according to at least one of the set of edge sample values {SS($D_{K-1}$=0), SS($D_{K-1}$=1)} (e.g. the edge sample values SS($D_{K-1}$=0) and/or SS($D_{K-1}$=1)), and a second data sample value (e.g. the data sample value $D_{K-1}$) within the plurality of second data sample values, to generate a phase adjustment signal PADJ in order to perform phase adjustment on at least one of a set of clock signals CLK_Data and CLK_Edge (e.g. the clock signals CLK_Data and/or CLK_Edge), where the set of clock signals CLK_Data and CLK_Edge may be configured to perform sampling control related to slicing operations, and more particularly, may be configured to perform sampling control of the slicers (e.g. one or more slicers of the data slicer CMP(0), the set of edge slicers {CMP(+$h_{0.5}$), CMP(-$h_{0.5}$)} and the error slicer CMP($h_0$)).

In this embodiment, the control circuit 110 may generate a plurality of parameters or parameter values at least according to an error sample value such as the error sample value $E_K$ and the plurality of second data sample values such as the data sample values $D_{K-1}$, $D_{K-2}$, ... and $D_{K-N}$, and may dynamically update the plurality of parameters based on at least one predetermined rule (e.g. one or more predetermined rules) to perform the DFE adaptation control, where the plurality of parameters may comprise the other parameter such as the error adjustment parameter (e.g. the parameter $h_0$), the at least one parameter such as the at least one edge adjustment parameter (e.g. the parameters $\{+h_{0.5}, -h_{0.5}\}$), a first parameter such as a data adjustment parameter (e.g. a parameter $h_1$) and a factor adjustment parameter (e.g. a parameter $\alpha$). An absolute value of any of the at least one parameter such as the at least one edge adjustment parameter (i.e. $|+h_{0.5}|$ or $|-h_{0.5}|$) is equal to a product of the factor adjustment parameter and the first parameter (such as the data adjustment parameter), e.g. a product ($\alpha*h_1$) or $\alpha h_1$. Regarding at least one data pattern, for example, under a condition of processing a designated pattern, the control circuit 110 may selectively replace the error sample value $E_K$ with a predetermined value according to whether a temporary storage value $E_K(h_{0.5})$ of the error sample value $E_K$ conforms to a predetermined condition, to control the other parameter such as the error adjustment parameter and the first parameter such as the data adjustment parameter (e.g. the parameters $h_0$ and $h_1$) in order to prevent triggering an unstable effect, to thereby prevent the receiver from undergoing abnormal operations, where the temporary storage value $E_K(h_{0.5})$ of the error sample value $E_K$ may be regarded as an error data temporary storage value. Related schemes will be further described in the following embodiments, where these schemes are applicable to the receiver of the architecture shown in FIG. 1, and more particularly, the apparatus 101 and respective components therein.

Figure 2:
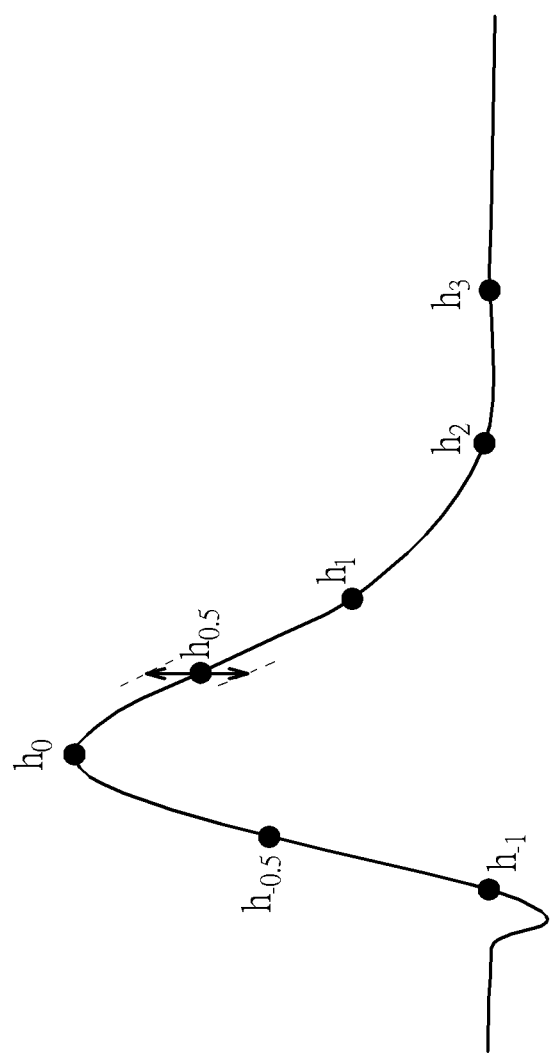
FIG. 2 is a scheme for performing DFE adaptation control according to an embodiment of the present invention.

FIG. 2 is a scheme for performing DFE adaptation control according to an embodiment of the present invention. For example, the plurality of parameters controlled by the scheme may comprise a series of parameters corresponding to a plurality of data sampling time points, such as the parameter $h_0$ corresponding to a current time point, parameters $h_1, h_2, h_3, \ldots h_N$, etc. corresponding to time points in the positive direction and parameters $h_{-1}, \ldots$, etc. corresponding to time points in the negative direction, but the present invention is not limited thereto. As shown in FIG. 2, the parameters $-h_{0.5}$ and $h_{0.5}$ may respectively correspond to two edge sampling time points, and each of these two edge sampling time points is located in the middle of two adjacent data sampling time points. By adjusting a certain parameter such as the parameter $h_{0.5}$, the control circuit 110 may correct a signal passing through a communications channel, e.g. by increasing or decreasing the signal. A front-end circuit of the receiver may receive a wired or wireless signal from a transmitter via the communication channel, to generate the data signal DATA on an input terminal of the architecture shown in FIG. 1. In some embodiments, the parameters $h_{-1}, h_0, h_1$ may be regarded as a pre-cursor parameter, a main cursor parameter and a post-cursor parameter, but the present invention is not limited thereto.

For better comprehension, some implementation details of the architecture shown in FIG. 1 are further described as follows. According to some embodiments, each arithmetic circuit within the arithmetic circuits A11 and A12 may comprise any combination of an adder, a subtractor and an inverter, e.g. one of these components, or a combination of at least two of these components. For example, the aforementioned each arithmetic circuit may comprise the adder and the inverter. The adder may have a first input terminal (e.g. a non-inverted input terminal "+"), a second input terminal and an output terminal, and the inverter may have an input terminal (e.g. an inverted input terminal "−") and an output terminal, where the second input terminal of the adder is coupled to the output terminal of the inverter, and the output terminal of the adder may be utilized as an output terminal of the aforementioned each arithmetic circuit. In another example, the aforementioned each arithmetic circuit may comprise the subtractor. The subtractor may have a first input terminal (e.g. a non-inverted input terminal "+"), a second input terminal (e.g. an inverted input terminal "−") and an output terminal, where the output terminal of the subtractor may be utilized as the output terminal of the aforementioned each arithmetic circuit. Note that the arithmetic circuits A1 and A2 may be implemented as adders in these embodiments. In addition, the control circuit 110 may be coupled to the phase detector 124, and perform the phase detection on the aforementioned at least one of the set of clock signals CLK_Data and CLK_Edge (e.g. the clock signals CLK_Data and/or CLK_Edge) according to the phase adjustment signal PADJ. The apparatus 101 may comprise at least one first switch (e.g. one or more switches) coupled to the arithmetic circuit A11, such as the switches SW1 and SW2, where the switch SW2 may be configured to perform sampling control for the data slicer CMP(0) according to the clock signal CLK_Data, and the switch SW1 may be configured to perform sampling control for the error slicer CMP($h_0$) according to the clock signal CLK_Data. The apparatus 101 may comprise at least one second switch (e.g. one or more switches) coupled to the arithmetic circuit A12, such as the switches SW3 and SW4, which may be configured to perform sampling control for the set of edge slicers $\{$CMP $(+h_{0.5})$, CMP$(-h_{0.5})\}$ according to the clock signal CLK_Edge. Additionally, the multiplexer 122 may be coupled to the set of edge slicers $\{$CMP$(+h_{0.5})$, CMP$(-h_{0.5})\}$, and may select one of the edge sample signals $\{SS(D_{K-1}=0), SS(D_{K-1}=1)\}$ such as an edge sample signal within the set of edge sample signals $\{SS(D_{K-1}=0), SS(D_{K-1}=1)\}$ according to the second data sample value (e.g. the data sample value $D_{K-1}$), to obtain the edge sample value $X_K$ carried by the edge sample signal, where the phase detector 124 may perform the phase detection according to the edge sample value. For example, when the data sample value $D_{K-1}$ is equal to a logic value 0 ($D_{K-1}=0$), the edge sample signal may represent the edge sample signal $SS(D_{K-1}=0)$. In another example, when the data sample value $D_{K-1}$ is equal to a logic value 1 ($D_{K-1}=1$), the edge sample signal may represent the edge sample signal $SS(D_{K-1}=1)$.

According to some embodiments, the pattern detector 112 may perform pattern detection to determine whether a current data pattern currently carried by the data signal DATA conforms to a specific data pattern of the at least one data pattern. For better comprehension, the aforementioned at least one data pattern may comprise data patterns $\{0, 1, 1\}$ and $\{1, 0, 0\}$, but the present invention is not limited thereto. Based on the aforementioned at least one predetermined rule, the parameter adjustment module 114 may dynamically update the plurality of parameters to perform the DFE adaptation control. For example, in response to a trigger of the current data pattern conforming to the specific data pattern (e.g. any of the data patterns $\{0, 1, 1\}$ and $\{1, 0, 0\}$), the parameter adjustment module 114 may selectively replace the error sample value $E_K$ with the predetermined value (e.g. a certain logic value such as one of the logic values 0 and 1) according to whether the temporary storage value $E_K(h_{0.5})$ of the error sample value $E_K$ conforms to the predetermined condition, to control the other parameter such as the error adjustment parameter and the first parameter such as the data adjustment parameter (e.g. the parameters $h_0$ and $h_1$). Regarding the aforementioned at least one data pattern, for example, if the temporary storage value $E_K(h_{0.5})$ of the error sample value $E_K$ conforms to the predetermined condition, the control circuit 110 may replace the error sample value $E_K$ with the predetermined value (e.g. this logic value), to control the other parameter such as the error adjustment parameter and the first parameter such as the data adjustment parameter according to the predetermined value; otherwise, the control circuit 110 may control the other parameter such as the error adjustment parameter and the first parameter such as the data adjustment parameter according to the error sample value $E_K$.

Figure 3:
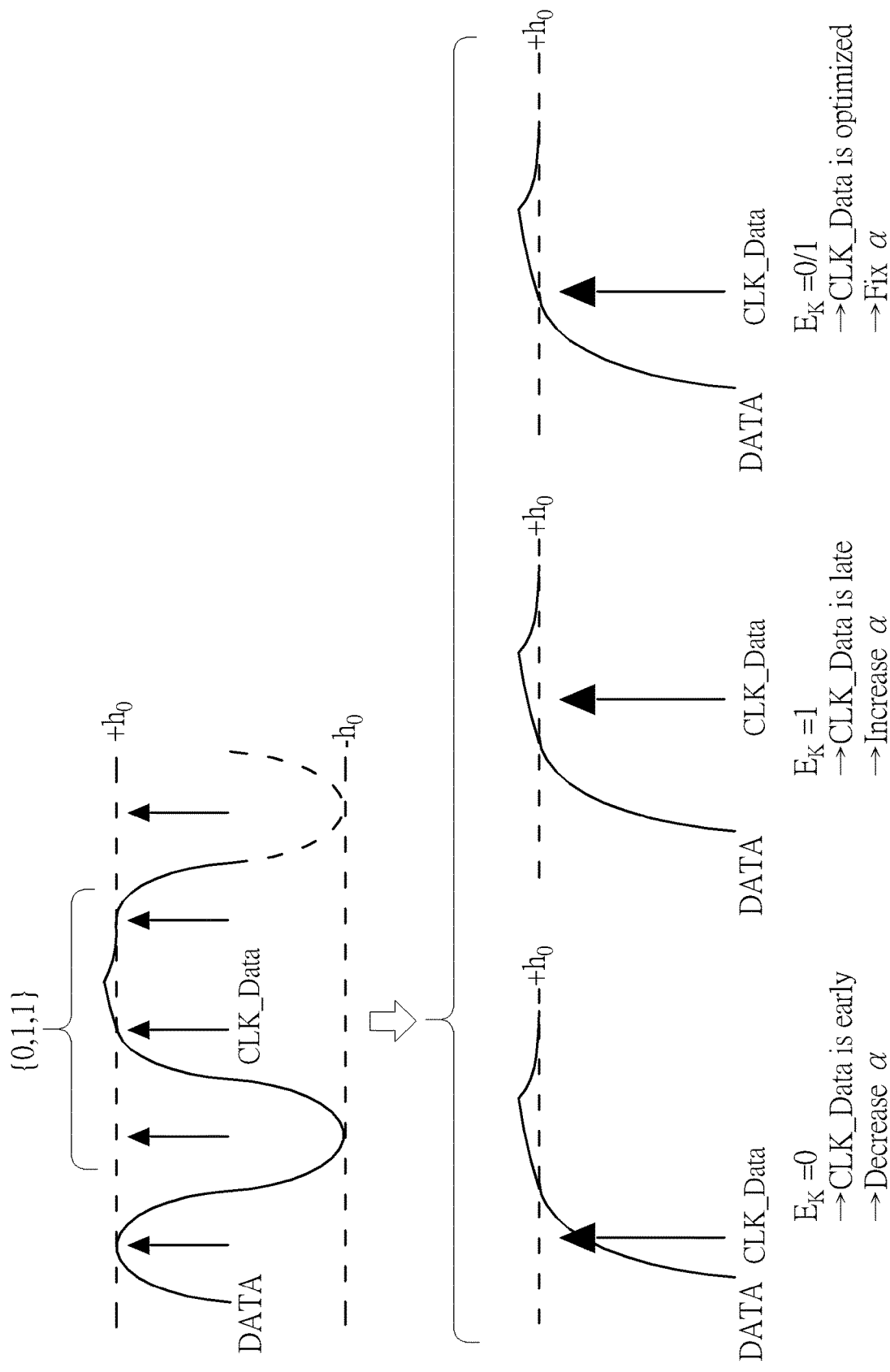
FIG. 3 illustrates an α-adjustment scheme according to an embodiment of the present invention.

FIG. 3 illustrates an α-adjustment scheme according to an embodiment of the present invention. The data signal DATA shown in the upper-half of FIG. 3 may carry the data pattern {0, 1, 1}. Regarding the data pattern {0, 1, 1}, the control circuit 110 (more particularly, the parameter adjustment module 114 therein) may adjust the parameter α according to the error sample value $E_K$. For example, when the error sample value $E_K$ is equal to the logic value 0 (which may correspond to a condition where the clock signal CLK_Data is early), the control circuit 110 may decrease the parameter α. In another example, when the error sample value $E_K$ is equal to the logic value 1 (which may correspond to a condition where the clock signal CLK_Data is late), the control circuit 110 may increase the parameter α. In yet another example, when the error sample value $E_K$ is switching or skipping between the logic values 0 and 1 (which may correspond to a condition where the clock signal CLK_Data is optimized), the control circuit 110 may fix the parameter α. These are for illustrative purposes only, and are not meant to be limitations of the present invention. According to some embodiments, regarding the data pattern {0, 1, 1}, the control circuit 110 (more particularly, the parameter adjustment module 114 therein) may adjust the parameter α according to the temporary storage value $E_K(h_{0.5})$ of the error sample value $E_K$. For example, when the temporary storage value $E_K(h_{0.5})$ of the error sample value $E_K$ is equal to the logic value 0 (which may correspond to a condition where the clock signal CLK_Data is early), the control circuit 110 may decrease the parameter α. In another example, when the temporary storage value $E_K(h_{0.5})$ of the error sample value $E_K$ is equal to the logic value 1 (which may correspond to a condition where the clock signal CLK_Data is late), the control circuit 110 may increase the parameter α. In yet another example, when the temporary storage value $E_K(h_{0.5})$ of the error sample value $E_K$ is switching or skipping between the logic values 0 and 1 (which may correspond to a condition where the clock signal CLK_Data is optimized), the control circuit 110 may fix the parameter α.

Figure 4:
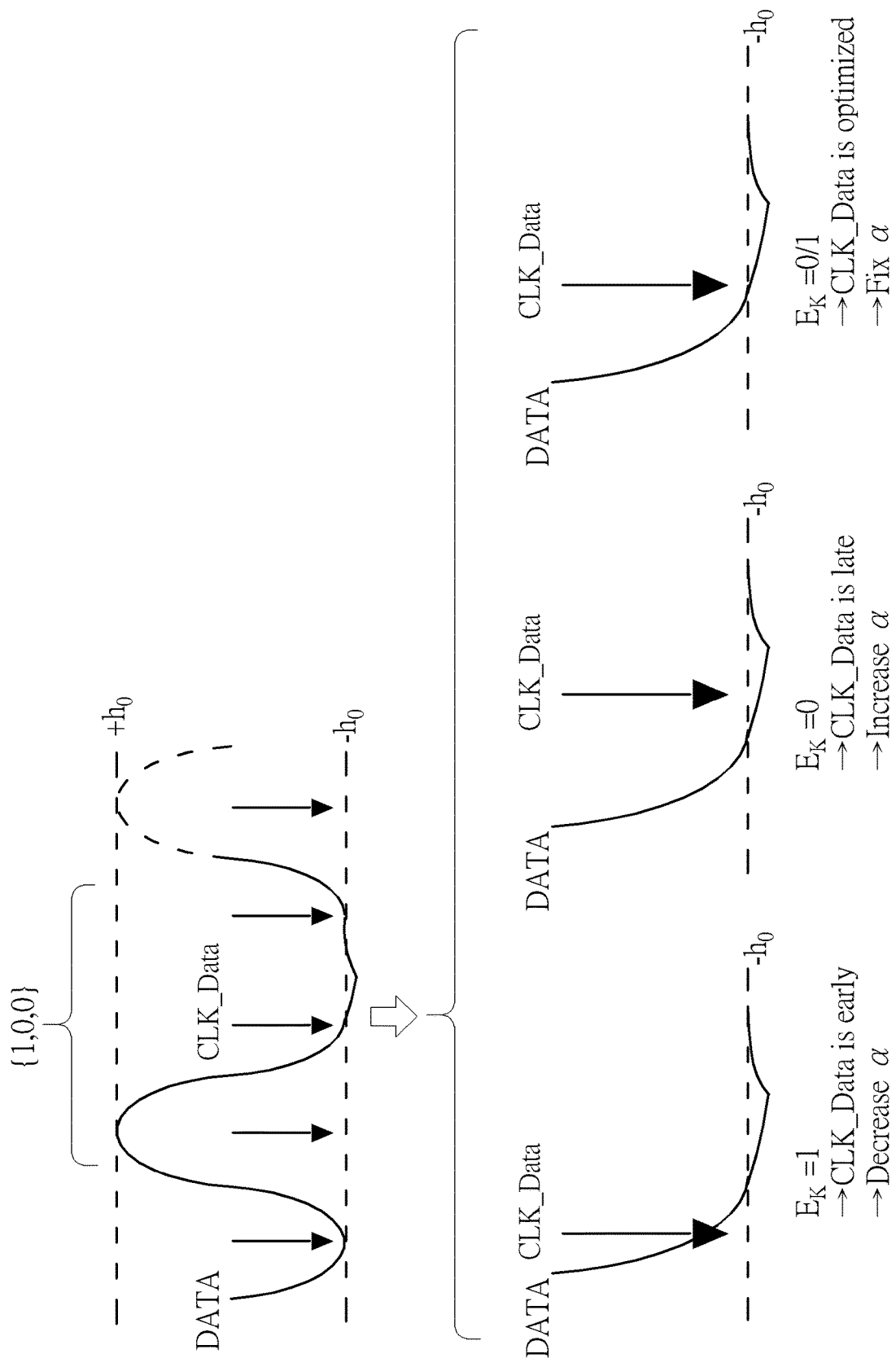
FIG. 4 illustrates another α-adjustment scheme according to another embodiment of the present invention.

FIG. 4 illustrates another α-adjustment scheme according to another embodiment of the present invention. The data signal DATA shown in the upper-half of FIG. 4 may carry a data pattern {1, 0, 0}. Regarding the data pattern {1, 0, 0}, the control circuit 110 (more particularly, the parameter adjustment module 114 therein) may adjust the parameter α according to the error sample value $E_K$. For example, when the error sample value $E_K$ is equal to the logic value 1 (which may correspond to a condition where the clock signal CLK_Data is early), the control circuit 110 may decrease the parameter α. In another example, when the error sample value $E_K$ is equal to the logic value 0 (which may correspond to a condition where the clock signal CLK_Data is late), the control circuit 110 may increase the parameter α. In yet another example, when the error sample value $E_K$ is switching or skipping between the logic values 0 and 1 (which may correspond to a condition where the clock signal CLK_Data is optimized), the control circuit 110 may fix the parameter α. These are for illustrative purposes only, and are not meant to be limitations of the present invention. According to some embodiments, regarding the data pattern {1, 0, 0}, the control circuit 110 (more particularly, the parameter adjustment module 114 therein) may adjust the parameter α according to the temporary storage value $E_K(h_{0.5})$ of the error sample value $E_K$. For example, when the temporary storage value $E_K(h_{0.5})$ of the error sample value $E_K$ is equal to the logic value 1 (which may correspond to a condition where the clock signal CLK_Data is early), the control circuit 110 may decrease the parameter α. In another example, when the temporary storage value $E_K(h_{0.5})$ of the error sample value $E_K$ is equal to the logic value 0 (which may correspond to a condition where the clock signal CLK_Data is late), the control circuit 110 may increase the parameter α. In yet another example, when the temporary storage value $E_K(h_{0.5})$ of the error sample value $E_K$ is switching or skipping between the logic values 0 and 1 (which may correspond to a condition where the clock signal CLK_Data is optimized), the control circuit 110 may fix the parameter α.

Figure 5:
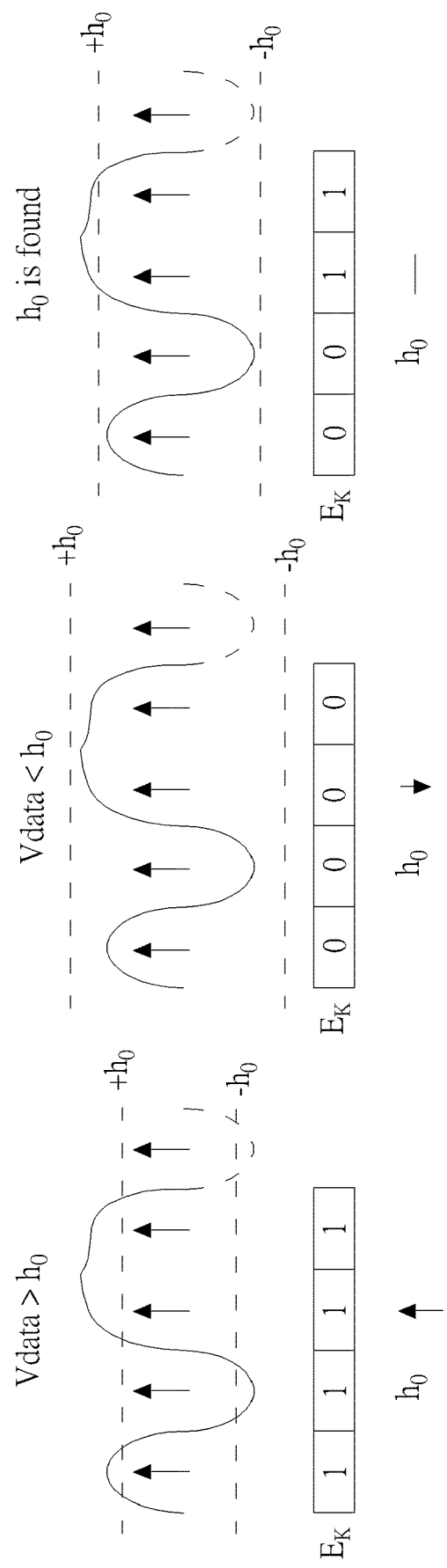
FIG. 5 illustrates an $h_0$-adjustment scheme according to an embodiment of the present invention.

FIG. 5 illustrates an $h_0$-adjustment scheme according to an embodiment of the present invention, where a voltage value Vdata of the data signal DATA may be regarded as a data voltage value. For better comprehension, the data pattern {0, 1, 1} may be taken as an example of the current data pattern, but the present invention is not limited thereto. The control circuit 110 (more particularly, the parameter adjustment module 114) may adjust the parameter $h_0$ according to the error sample value $E_K$. For example, when the error sample value EK is kept equal to the logic value 1 within a period (which may correspond to a condition where the voltage value Vdata of the data signal DATA is greater than the parameter $h_0$), the control circuit 110 may increase the parameter $h_0$. In another example, when the error sample value $E_K$ is kept equal to the logic value 0 within a period (which may correspond to a condition where the voltage value Vdata of the data signal DATA is less than the parameter $h_0$), the control circuit 110 may decrease the parameter $h_0$. In yet another example, when the error sample value $E_K$ switches, e.g. switches from the logic value 0 to the logic value 1 (which may correspond to a condition where the parameter $h_0$ is found or the voltage value Vdata of the data signal DATA approaches the parameter $h_0$), the control circuit 110 may fix the parameter $h_0$.

According to some embodiments, the voltage value Vdata of the data signal DATA may represent an average of amplitudes of the data signal DATA within a period, but the present invention is not limited thereto.

Figure 6:
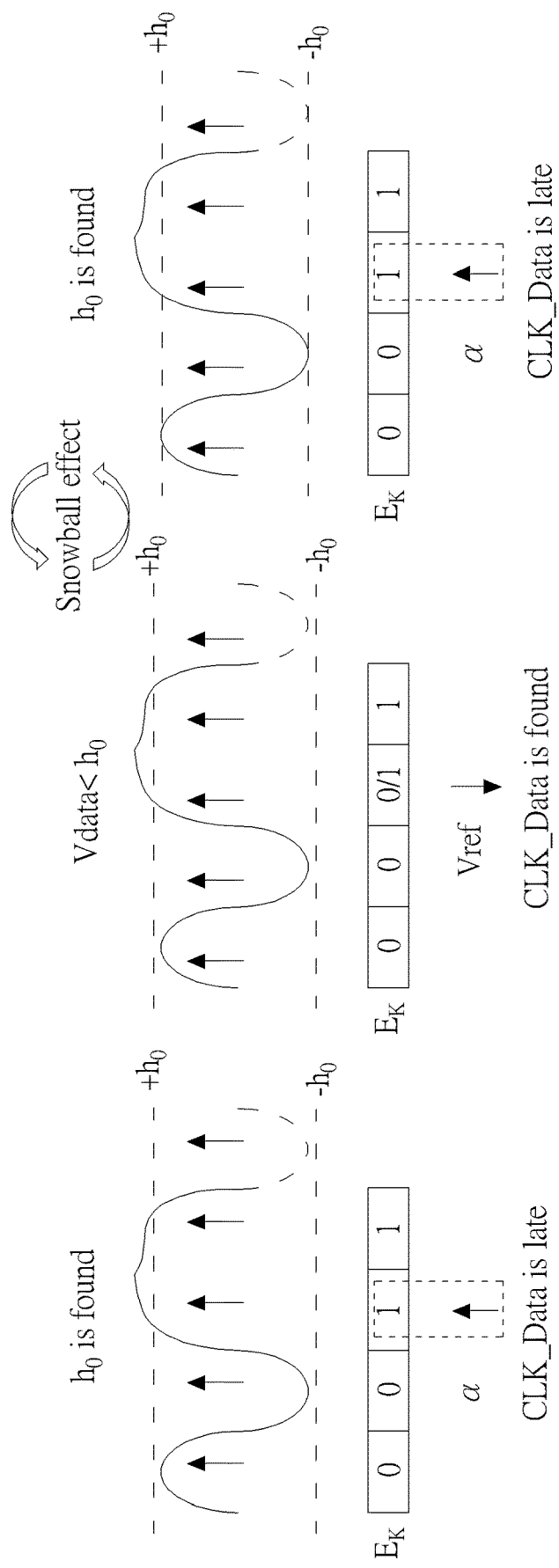
FIG. 6 illustrates an example of an unstable effect.

FIG. 6 illustrates an example of the unstable effect such as a snowball effect. For better comprehension, it can be assumed that a specific function of the control circuit 110 does not take effect (e.g. is temporarily disabled or not implemented), but the present invention is not limited thereto. A condition shown in the left part of FIG. 6 may be the same as a condition shown in the left part of FIG. 5. Under a condition where the parameter $h_0$ is found, the control circuit 110 may adjust the parameter α according to the error sample value $E_K$. For example, when the error sample value $E_K$ is equal to the logic value 1 (which may correspond to a condition where the clock signal CLK_Data is late), the control circuit 110 may increase the parameter α. This adjustment (increasing the parameter α) might cause the condition Vdata<$h_0$. As shown in the middle of FIG. 6, when the error sample value $E_K$ is switching or skipping between the logic values 0 and 1 (which may correspond to a condition where the clock signal CLK_Data is found or optimized), the control circuit 110 may fix the parameter α. As Vdata<$h_0$, the control circuit 110 may decrease the parameter $h_0$ by decreasing a reference voltage Vref corresponding to the parameter $h_0$, in order to try to make the voltage value Vdata of the data signal DATA approach the parameter $h_0$. Accordingly, as shown in the right part of FIG. 6, the parameter $h_0$ is found. This adjustment (decreasing the parameter $h_0$) might cause a condition where the clock signal CLK_Data is late. Consecutive switching between the condition shown in the middle of FIG. 6 and the condition shown in the right part of FIG. 6 may be referred to as the snowball effect.

According to some embodiments, under a condition where the specific function takes effect (e.g. is enabled or implemented), the control circuit 110 can prevent triggering the unstable effect such as the snowball effect, and thereby prevent abnormal operations. The control circuit 110 may temporarily store the temporary storage value $E_K(h_{0.5})$ of the error sample value $E_K$ to be a first error sample value, and the control circuit 110 may temporarily store the temporary storage value $E_K(h_{0.5})$ of the error sample value $E_K$ or the predetermined value to be a second error sample value. Regarding the aforementioned at least one data pattern, if the temporary storage value $E_K(h_{0.5})$ of the error sample value $E_K$ conforms to the predetermined condition, the control circuit 110 may temporarily utilize the predetermined value to be the second error sample value, e.g. temporarily store the predetermined value to be the second error sample value; otherwise, the control circuit 110 may temporarily utilize the temporary storage value $E_K(h_{0.5})$ of the error sample value $E_K$ to be the second error sample value, e.g. temporarily store the temporary storage value $E_K(h_{0.5})$ of the error sample value $E_K$ to be the second error sample value; but the present invention is not limited thereto. For example, the aforementioned at least one predetermined rule may comprise a first predetermined rule, a second predetermined rule and a third predetermined rule. Based on the first predetermined rule, the control circuit may dynamically update the factor adjustment parameter such as the parameter α according to the first error sample value (e.g. the temporary storage value $E_K(h_{0.5})$) e.g. perform the operations of the α-adjustment scheme shown in FIG. 3 according to the first error sample value, and perform the operations of the α-adjustment scheme shown in FIG. 4 according to the first error sample value. In addition, based on the second predetermined rule, the control circuit 110 may dynamically update the other parameter such as the error adjustment parameter (e.g. the parameter $h_0$) according to the second error sample value (e.g. the predetermined value or the temporary storage value $E_K(h_{0.5})$), e.g. perform the operations of the $h_0$-adjustment scheme shown in FIG. 5 according to the second error sample value. Additionally, based on the third predetermined rule, the control circuit 110 may dynamically update the first parameter such as the data adjustment parameter (e.g. the parameter $h_1$) according to the second error sample value (e.g. the predetermined value or the temporary storage value $E_K(h_{0.5})$).

Some implementation details regarding the first predetermined rule are further described as follows. Regarding the data pattern {0, 1, 1}, the control circuit 110 (more particularly, the parameter adjustment module 114 therein) may adjust the parameter α according to the first error sample value (e.g. the temporary storage value $E_K(h_{0.5})$). For example, when the first error sample value is equal to the logic value 0 (which may correspond to a condition where the clock signal CLK_Data is early), the control circuit 110 may decrease the parameter α. In another example, when the first error sample vale is equal to the logic value 1 (which may correspond to a condition where the clock signal CLK_Data is late), the control circuit 110 may increase the parameter α. In yet another example, when the first error sample value is switching or skipping between the logic values 0 and 1 (which may correspond to a condition where the clock signal CLK_Data is optimized), the control circuit 110 may fix the parameter α. In addition, regarding the data pattern {1, 0, 0}, the control circuit 110 (more particularly, the parameter adjustment module 114 therein) may adjust the parameter α according to the first error sample value (e.g. the temporary storage value $E_K(h_{0.5})$). For example, when the first error sample value is equal to the logic value 1 (which may correspond to a condition where the clock signal CLK_Data is early), the control circuit 110 may decrease the parameter α. In another example, when the first error sample value is equal to the logic value 0 (which may correspond to a condition where the clock signal CLK_Data is late), the control circuit 110 may increase the parameter α. In yet another example, when the first error sample value is switching or skipping between the logic values 0 and 1 (which may correspond to a condition where the clock signal CLK_Data is optimized), the control circuit 110 may fix the parameter α.

Figure 7:
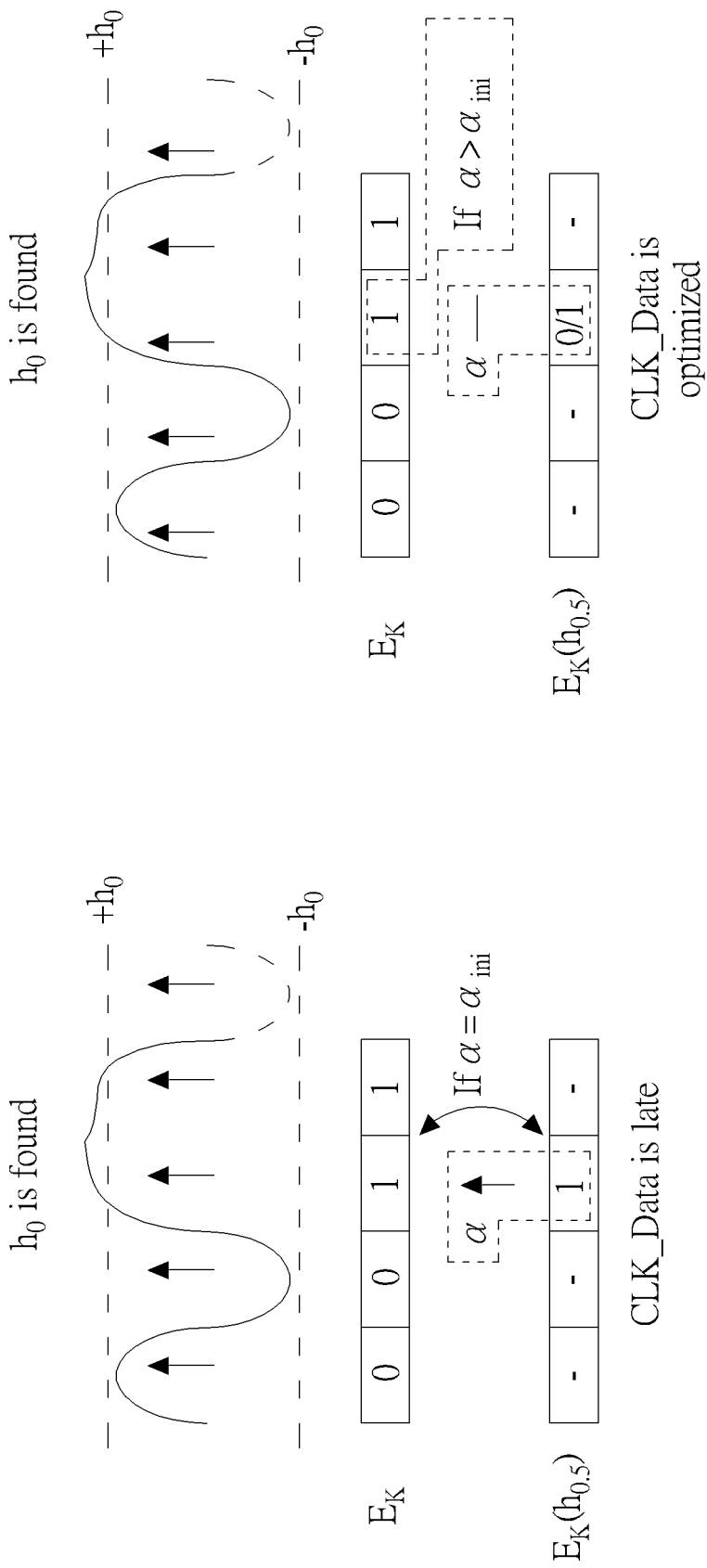
FIG. 7 illustrates a hybrid adjustment scheme according to an embodiment of the present invention.

FIG. 7 illustrates a hybrid adjustment scheme according to an embodiment of the present invention. In any (more particularly, each) of the left-half portion and the right-half portion of FIG. 7, a second row of logic values labeled "$E_K(h_{0.5})$" may be taken as an example of the first error sample value, and a first row of logic values labeled "$E_K$" may be taken as an example of the second error sample value. As shown in the left-half portion of FIG. 7, as the data pattern {0, 1, 1} is detected, the control circuit 110 may adjust the parameter α according to the first error sample value (e.g. the temporary storage value $E_K(h_{0.5})$) such as a logic value 1 within the second row of logic values, where other logic values within the second row of logic values may be regarded as "Don't care" (indicated by dashes). For example, when the first error sample value is equal to the logic value 1 (which may correspond to a condition where the clock signal CLK_Data is late), the control circuit 110 may increase the parameter α. In addition, assume that a parameter $α_{ini}$ may represent a previous value of the parameter α. According to this embodiment, under a condition where α=$α_{ini}$, as the temporary storage value $E_K(h_{0.5})$ of the error sample value $E_K$ does not conform to the predetermined condition, the control circuit 110 may temporarily store the temporary storage value $E_K(h_{0.5})$ of the error sample value $E_K$ to be the second error sample value, and performing the aforementioned replacement operation (more particularly, performing the replacement operation in the first row of logic values (e.g. replacing a certain logic value within the first row of logic values {0, 0, 1, 1} with the predetermined value)) is not required. Accordingly, the control circuit 110 does not replace any logic value within the first row of logic values (such as the logic values {0, 0, 1, 1}).

As shown in the right-half portion of FIG. 7, as the data pattern {0, 1, 1} is detected, the control circuit 110 may determine whether to adjust the parameter α according to the first error sample value (e.g. the temporary storage value $E_K(h_{0.5})$) such as logic values 0/1 within the second row of logic values, where other logic values within the second row of logic values may be regarded as "Don't care" (indicated by dashes). For example, when the first error sample value is switching or skipping between the logic values 0 and 1 (which may correspond to a condition where the clock signal CLK_Data is optimized), the control circuit 110 may fix the parameter α. According to this embodiment, under a condition where α>α$_{ini}$, as the temporary storage value E$_K$(h$_{0.5}$) of the error sample value E$_K$ conforms to the predetermined condition, the control circuit 110 may temporarily store the predetermined value (e.g. the logic value 1) to be the second error sample value, rather than utilize the temporary storage value E$_K$(h$_{0.5}$) (which might switch or skip between the logic values 0 and 1) to be the second error sample value. Accordingly, in the first row of logic values (e.g. the logic values {0, 0, 1, 1}), the control circuit 110 has replaced a third logic value (a logic value indicated by dashed lines) with the predetermined value (e.g. the logic value 1). Thus, the control circuit 110 can prevent triggering the unstable effect such as the snowball effect, and thereby prevent abnormal operations.

Figure 8:
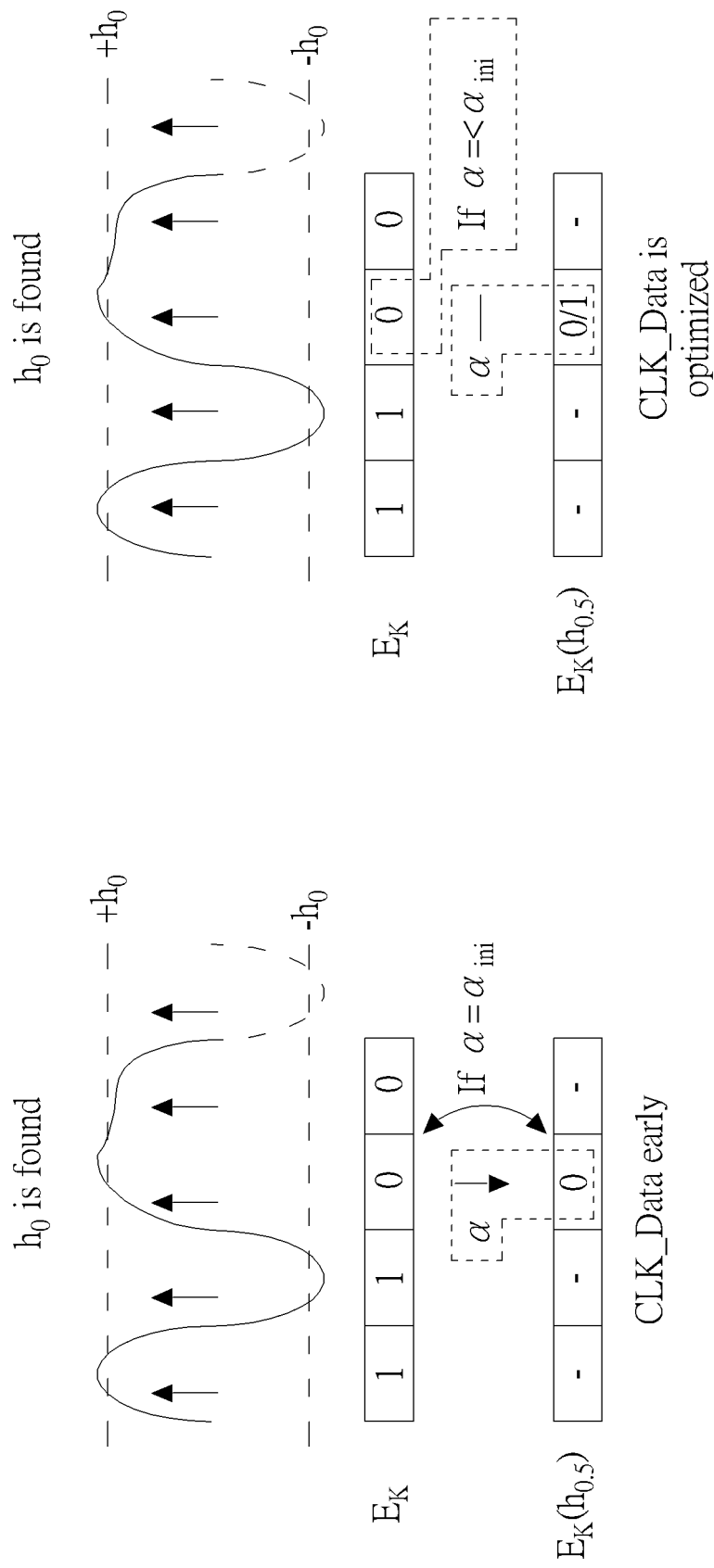
FIG. 8 illustrates another hybrid adjustment scheme according to another embodiment of the present invention.

FIG. 8 illustrates a hybrid adjustment scheme according to another embodiment of the present invention. In any (more particularly, each) of the left-half portion and the right-half portion of FIG. 8, a second row of logic values labeled "E$_K$(h$_{0.5}$)" may be taken as an example of the first error sample value, and a first row of logic values labeled "E$_K$" may be taken as an example of the second error sample value. As shown in the left-half portion of FIG. 8, as the data pattern {0, 1, 1} is detected, the control circuit 110 may adjust the parameter α according to the first error sample value (e.g. the temporary storage value E$_K$(h$_{0.5}$)) such as a logic value 0 within the second row of logic values, where other logic values within the second row of logic values may be regarded as "Don't care" (indicated by dashes). For example, when the first error sample value is equal to the logic value 0 (which may correspond to a condition where the clock signal CLK_Data is early), the control circuit 110 may decrease the parameter α. In addition, assume that the parameter α$_{ini}$ may represent a previous value of the parameter α. According to this embodiment, under a condition where α=α$_{ini}$, as the temporary storage value E$_K$(h$_{0.5}$) of the error sample value E$_K$ does not conform to the predetermined condition, the control circuit 110 may temporarily store the temporary storage value E$_K$(h$_{0.5}$) of the error sample value E$_K$ to be the second error sample value, and performing the aforementioned replacement operation (more particularly, performing the replacement operation in the first row of logic values (e.g. replacing a certain logic value within the first row of logic values {1, 1, 0, 0} with the predetermined value)) is not required. Accordingly, the control circuit 110 does not replace any logic value within the first row of logic values (such as the logic values {1, 1, 0, 0}).

As shown in the right-half portion of FIG. 8, as the data pattern {0, 1, 1} is detected, the control circuit 110 may determine whether to adjust the parameter α according to the first error sample value (e.g. the temporary storage value E$_K$(h$_{0.5}$)) such as logic values 0/1 within the second row of logic values, where other logic values within the second row of logic values may be regarded as "Don't care" (indicated by dashes). For example, when the first error sample value is switching or skipping between the logic values 0 and 1 (which may correspond to a condition where the clock signal CLK_Data is optimized), the control circuit 110 may fix the parameter α. According to this embodiment, under a condition where α<α$_{ini}$, as the temporary storage value E$_K$(h$_{0.5}$) of the error sample value E$_K$ conforms to the predetermined condition, the control circuit 110 may temporarily store the predetermined value (e.g. the logic value 0) to be the second error sample value, rather than utilizing the temporary storage value E$_K$(h$_{0.5}$) (which might switch or skip between the logic values 0 and 1) to be the second error sample value. Accordingly, in the first row of logic values (e.g. the logic values {1, 1, 0, 0}), the control circuit 110 has replaced a third logic value (a logic value indicated by dashed lines) with the predetermined value (e.g. the logic value 0). Thus, the control circuit 110 can prevent triggering the unstable effect such as the snowball effect, and thereby prevent abnormal operations.

Figure 9:
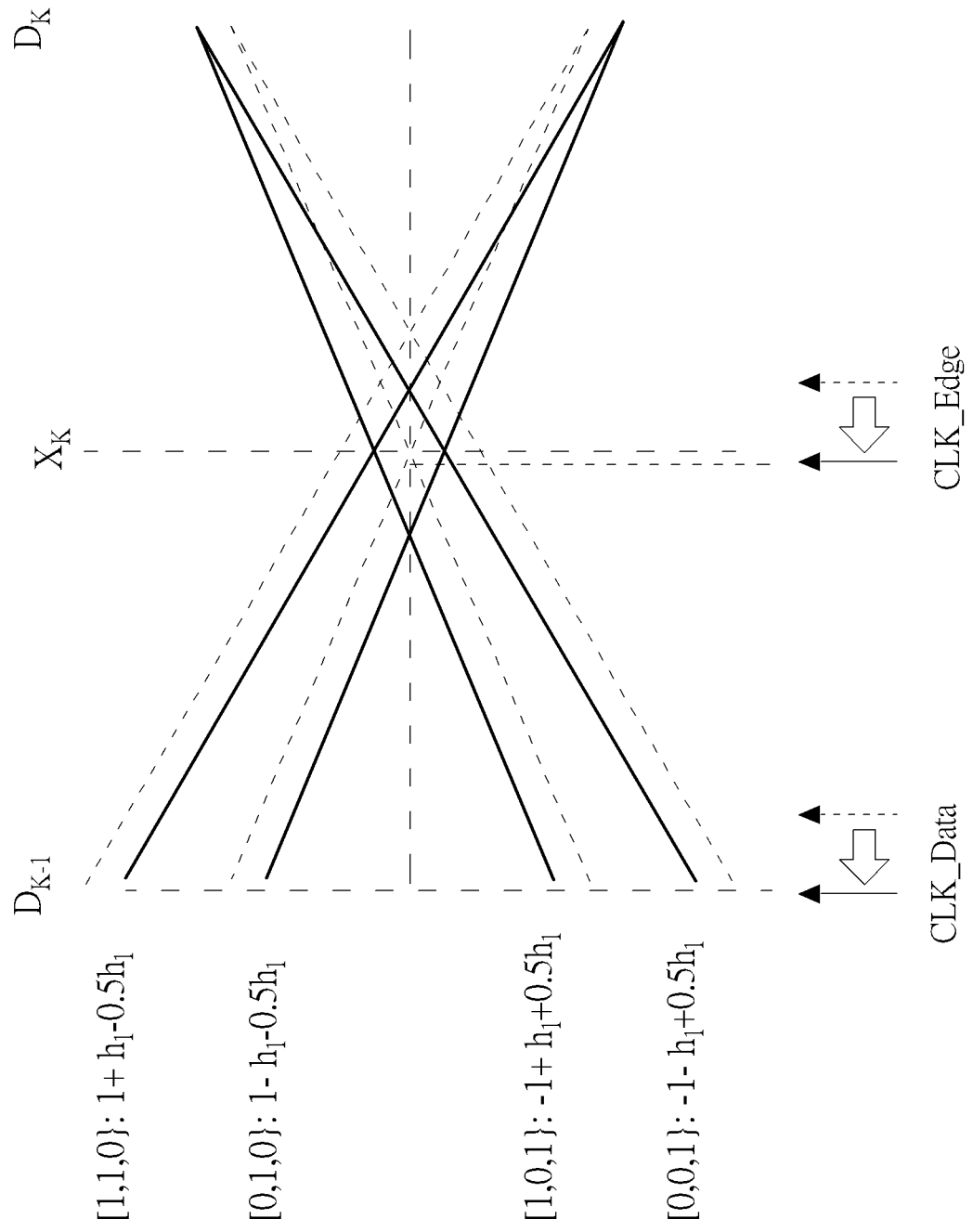
FIG. 9 illustrates a performance improvement scheme according to an embodiment of the present invention.

FIG. 9 illustrates a performance improvement scheme according to an embodiment of the present invention. As shown in the leftmost of FIG. 9, four sets of lines respectively correspond to data patterns {1, 1, 0}, {0, 1, 0}, {1, 0, 1} and {0, 0, 1}. Each set of the four sets of lines comprises a dashed line and a solid line, which respectively represent conditions before and after improvement, where the clock signals CLK_Data and CLK_Edge respectively align an ideal data sampling time point and an ideal edge sampling time point. For example, regarding the data patterns {1, 1, 0}, {0, 1, 0}, {1, 0, 1} and {0, 0, 1}, the control circuit 110 may respectively adjust associated parameters $(1+h_1)$, $(1-h_1)$, $(-1+h_1)$ and $(-1-h_1)$ as $(1+h_1-0.5h_1)$, $(1-h_1-0.5h_1)$, $(-1+h_1+0.5h_1)$ and $(-1-h_1+0.5h_1)$ in order to improve CDR performance, but the present invention is not limited thereto. For brevity, similar descriptions for this embodiment are not repeated in detail here.

According to some embodiments, the aforementioned at least one data pattern may comprise a first data pattern and a second data pattern, where the first data pattern may comprise a series of logic values, and the second data pattern may comprise another series of logic values. The other series of logic values may be respective inverted values of the series of logic values. For example, under a condition where the first data pattern and the second data pattern respectively represent the data patterns {0, 1, 1} and {1, 0, 0}, logic values within the data pattern {1, 0, 0} are inverted values of logic values within the data pattern {0, 1, 1}, but the present invention is not limited thereto. In some embodiments, the aforementioned at least one data pattern may vary. More particularly, a number of the series of logic values within the first data pattern may be greater than or equal to three, and/or a number of the series of logic values within the second data pattern may be greater than or equal to three. For example, the first data pattern and the second data pattern may respectively represent data patterns such as {1, 0, 1, 0, . . . , 1, 0, 0, 1, 1} and {1, 0, 1, 0, . . . , 1, 0, 1, 0, 0}. For brevity, similar descriptions for these embodiments are not repeated in detail here.

According to some embodiments, the control circuit 110 may perform pattern detection via the pattern detector 112, to utilize the architecture shown in FIG. 1 to perform Mueller-Muller (MM) phase detection upon the aforementioned at least one data pattern. For brevity, similar descriptions for these embodiments are not repeated in detail here.

According to some embodiments, the apparatus 101 may comprise at least one clock source (e.g. one or more clock sources), which may generate the sets of clock signals such as the clock signals CLK_Data and CLK_Edge. For example, the aforementioned at least one clock source may be installed inside or outside the control circuit 110. For brevity, similar descriptions for these embodiments are not repeated in detail here.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An apparatus for performing decision feedback equalizer (DFE) adaptation control, applicable to a receiver, the apparatus comprising:
   a plurality of arithmetic circuits, comprising:
      a first arithmetic circuit, configured to subtract a first feedback signal from a data signal of the receiver to generate a first signal; and
      a second arithmetic circuit, configured to subtract a second feedback signal from the data signal to generate a second signal;
   a plurality of slicers, configured to generate a plurality of sample values, the plurality of slicers comprising:
      a data slicer, coupled to the first arithmetic circuit, configured to slice the first signal to generate a first data sample value;
      a set of edge slicers, coupled to the second arithmetic circuit, configured to slice the second signal according to at least one parameter to generate a set of edge sample signals; and
      an error slicer, coupled to the first arithmetic circuit, configured to slice the first signal according to another parameter to generate an error sample value;
   a plurality of sample and hold circuits, coupled to the data slicer, configured to perform sample and hold operations according to the first data sample value to generate a plurality of second data sample values, wherein the first feedback signal represents a first linear combination of the plurality of second data sample values, and the second feedback signal represents a second linear combination of a portion of second data sample values within the plurality of second data sample values;
   a phase detector, coupled to the set of edge slicers and coupled to one of the plurality of sample and hold circuits, configured to perform phase detection according to at least one of the set of edge sample signals, and a second data sample value within the plurality of second data sample values, to generate a phase adjustment signal, for performing phase adjustment on at least one of a set of clock signals, wherein the set of clock signals is configured to perform sampling control related to slicing operations; and
   a control circuit, coupled to the data slicer, the error slicer and the plurality of sample and hold circuits, configured to generate a plurality of parameters at least according to the error sample value and the plurality of second data sample values, and dynamically update the plurality of parameters based on at least one predetermined rule to perform the DFE adaptation control, wherein the plurality of parameters comprise the other parameter, the at least one parameter, a first parameter and a factor adjustment parameter, an absolute value of any of the at least one parameter is equal to a product of the factor adjustment parameter and the first parameter, and regarding at least one data pattern, the control circuit selectively replaces the error sample value with a predetermined value according to whether a temporary storage value of the error sample value conforms to a predetermined condition to control the other parameter and the first parameter, in order to prevent triggering an unstable effect and thereby prevent the receiver from undergoing abnormal operations.

2. The apparatus of claim 1, wherein each arithmetic circuit of the first arithmetic circuit and the second arithmetic circuit comprises one of an adder, a subtractor and an inverter, or a combination thereof.

3. The apparatus of claim 1, wherein the set of clock signals comprises a first clock signal and a second clock signal; and the apparatus further comprises:
   at least one first switch, coupled to the first arithmetic circuit, configured to perform sampling control for the data slicer and the error slicer according to the first clock signal; and
   at least one second switch, coupled to the second arithmetic circuit, configured to perform sampling control for the set of edge slicers according to the second clock signal.

4. The apparatus of claim 3, wherein the at least one first switch comprises a plurality of switches, a switch within the plurality of switches performs sampling control for the error slicer according to the first clock signal, and another switch within the plurality of switches performs sampling control for the data slicer according to the first clock signal.

5. The apparatus of claim 3, wherein the at least one second switch comprises a plurality of switches, a switch within the plurality of switches performs sampling control for an edge slicer within the set of edge slicers according to the second clock signal, and another switch within the plurality of switches performs sampling control for another edge slicer within the set of edge slicers according to the second clock signal.

6. The apparatus of claim 1, further comprising:
   a multiplexer, coupled to the set of edge slicers, configured to select an edge sample signal within the set of edge sample signals according to the second data sample value, to obtain an edge sample value carried by the edge sample signal, wherein the phase detector performs the phase detection according to the edge sample value.

7. The apparatus of claim 1, wherein the control circuit comprises:
   a pattern detector, configured to perform pattern detection to determine whether a current data pattern currently carried by the data signal conforms to a specific data pattern of the at least one data pattern; and
   a parameter adjustment module, configured to dynamically update the plurality of parameters based on the at least one predetermined rule to perform the DFE adaptation control, wherein in response to a trigger of the current data pattern conforming to the specific data pattern, the parameter adjustment module selectively replaces the error sample value with the predetermined value according to whether the temporary storage value of the error sample value conforms to the predetermined condition in order to control the other parameter and the first parameter.

8. The apparatus of claim 1, wherein regarding the at least one data pattern, when the temporary storage value of the error sample value conforms to the predetermined condition, the control circuit replaces the error sample value with the predetermined value to control the other parameter and the first parameter according to the predetermined value; otherwise, the control circuit controls the other parameter and the first parameter according to the error sample value.

9. The apparatus of claim 1, wherein the control circuit temporarily stores the temporary storage value of the error sample value to be a first error sample value, and temporarily stores the temporary storage value of the error sample value or the predetermined value to be a second error sample value; and regarding the at least one data pattern, when the temporary storage value of the error sample value conforms to the predetermined condition, the control circuit temporarily stores the predetermined value to be the second error sample value; otherwise, the control circuit temporarily stores the temporary storage value of the error sample value to be the second error sample value.

10. The apparatus of claim 9, wherein based on a first predetermined rule within the at least one predetermined rule, the control circuit dynamically updates the factor adjustment parameter according to the first error sample value.

11. The apparatus of claim 9, wherein based on a second predetermined rule within the at least one predetermined rule, the control circuit dynamically updates the other parameter according to the second error sample value.

12. The apparatus of claim 9, wherein based on a third predetermined rule within the at least one predetermined rule, the control circuit dynamically updates the first parameter according to the second error sample value.

13. The apparatus of claim 1, wherein the at least one data pattern comprises a first data pattern and a second data pattern, the first data pattern comprises a series of logic values, the second data pattern comprises another series of logic values, and the other series of logic values are respective inverted values of the series of logic values.

14. The apparatus of claim 1, wherein the at least one data pattern comprises a first data pattern, the first data pattern comprises a series of logic values, and a number of the series of logic values is greater than or equal to three.

* * * * *